Figure 1:
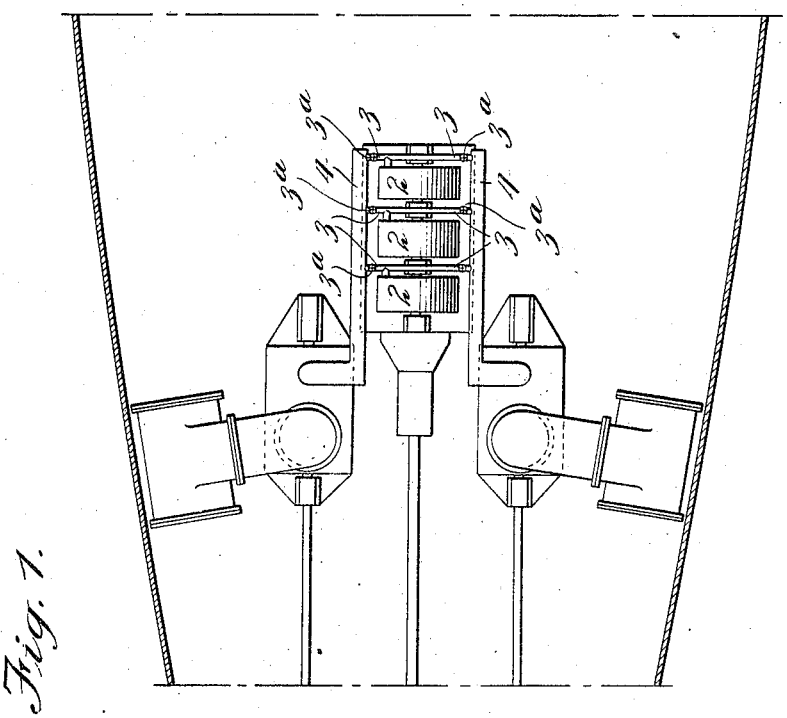

L. D. LOVEKIN.
FLUID PRESSURE POWER PLANT.
APPLICATION FILED MAR. 5, 1910.

1,008,726.

Patented Nov. 14, 1911.

6 SHEETS—SHEET 1.

Witnesses:

Inventor
Luther D. Lovekin
By his Attorneys
Gifford & Bull

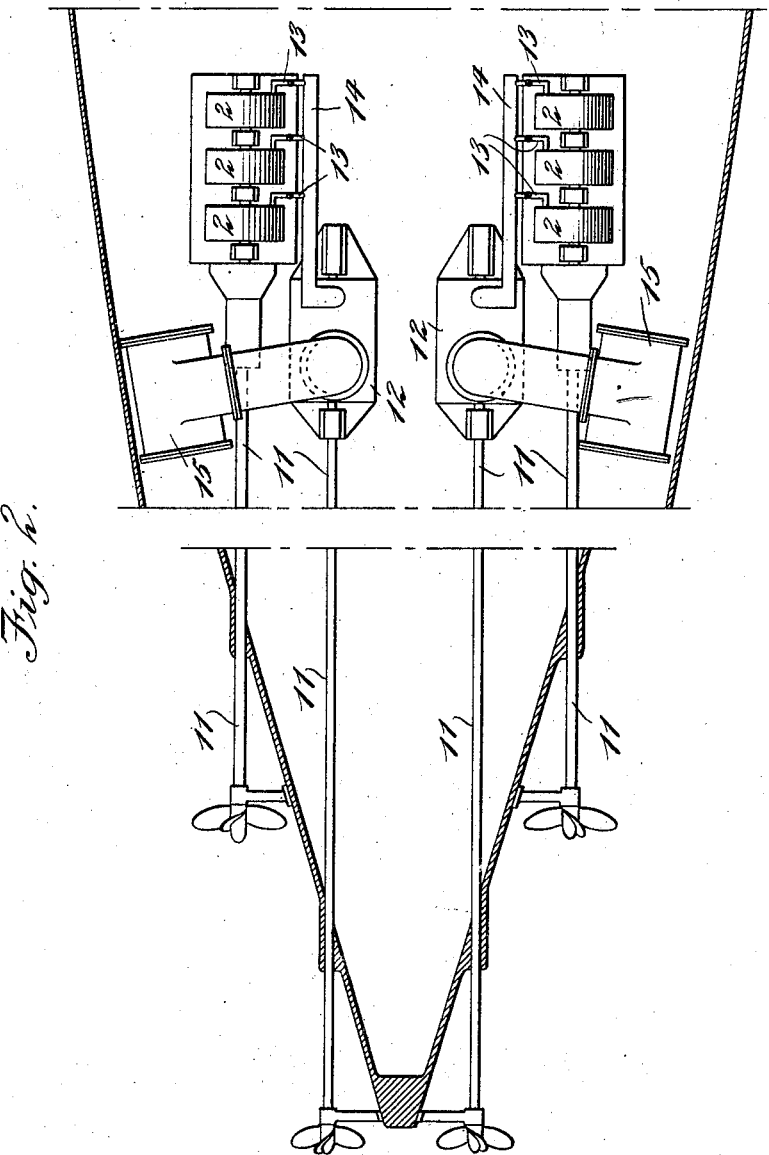

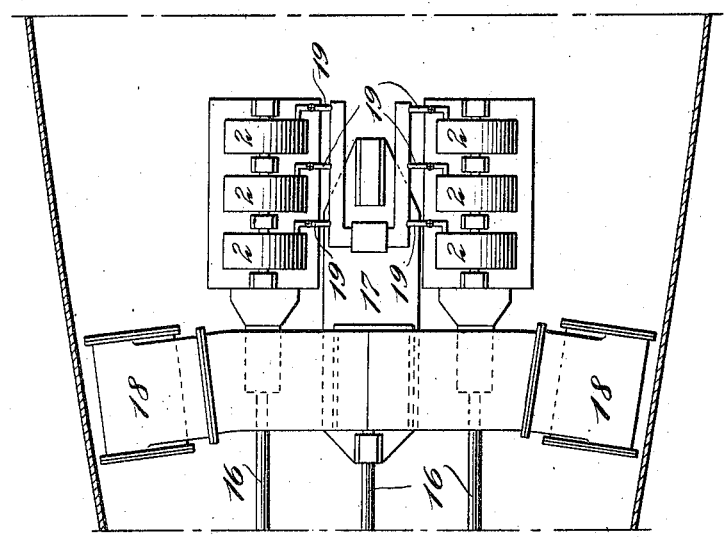
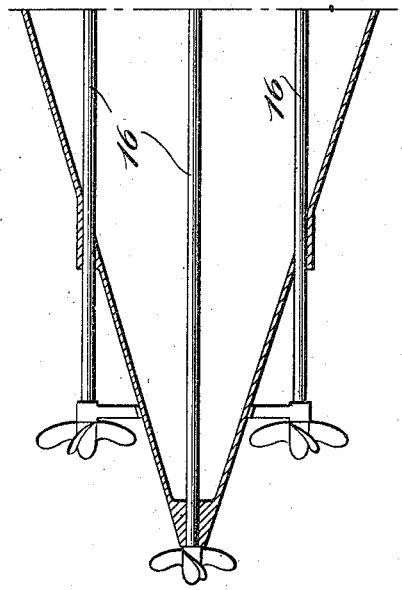

L. D. LOVEKIN.
FLUID PRESSURE POWER PLANT.
APPLICATION FILED MAR. 5, 1910.

1,008,726.

Patented Nov. 14, 1911.
6 SHEETS—SHEET 4.

L. D. LOVEKIN.
FLUID PRESSURE POWER PLANT.
APPLICATION FILED MAR. 5, 1910.
1,008,726.
Patented Nov. 14, 1911.
6 SHEETS—SHEET 6.
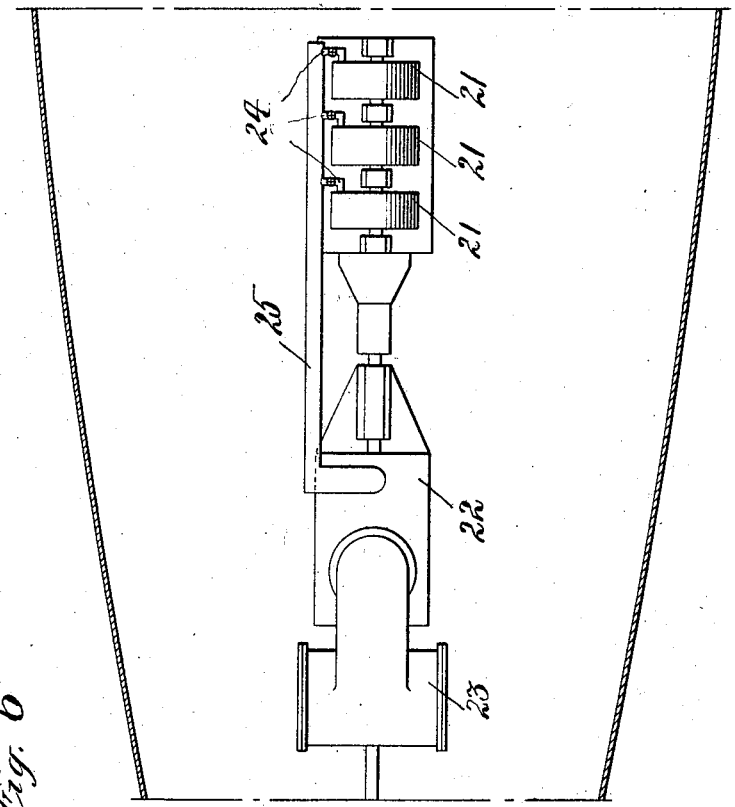
Fig. 6
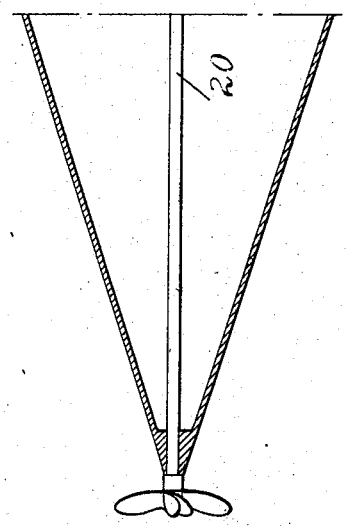
Witnesses:
Luther D. Lovekin, Inventor
By his Attorneys

UNITED STATES PATENT OFFICE.

LUTHER D. LOVEKIN, OF OVERBROOK, PENNSYLVANIA, ASSIGNOR TO GERARD DEVELOPMENT COMPANY, OF NEW YORK, N. Y., A CORPORATION OF NEW YORK.

FLUID-PRESSURE-POWER PLANT.

1,008,726.      Specification of Letters Patent.      Patented Nov. 14, 1911.

Application filed March 5, 1910. Serial No. 547,394.

*To all whom it may concern:*

Be it known that I, LUTHER D. LOVEKIN, a citizen of the United States, and a resident of Overbrook, in the county of Philadelphia and State of Pennsylvania, have invented a certain new and useful Improvement in Fluid-Pressure-Power Plants, of which the following is a specification.

My invention relates to new and useful improvements in fluid pressure power plants, and the object is to devise a plant of large power producing capacity which will be simple in construction, economical in consumption of the motive agent, and which will obviate the objections hitherto known in the well known types of power plants, and provide features of advantage hitherto unknown in the art.

The invention as at present contemplated is capable of wide application and I do not desire to be limited to any particular adaptation but I illustrate the same as applied for producing the motive power for driving the propeller shaft or shafts of marine vessels as the invention has advantages which make it particularly useful in this situation.

In the propulsion of marine vessels there have been three generally accepted types of power plants, namely, the reciprocating steam engine, the steam turbine, and a combination of the reciprocating engine and turbine. These systems all have their advantages which render them desirable under certain conditions but they all have their disadvantages which prevent them from attaining an ideal in accomplishing their intended purposes. The reciprocating engine has great power, is more or less economical in steam consumption, but has coupled with these advantages the disadvantages of the presence of inertia due to the reciprocating motion, complication in construction, inability to work satisfactorily with highly superheated steam, and its size and weight in very large powers. The turbine is unsatisfactory on account of its limitations as to economy, and its unsuitability to the best high pressure, high superheated conditions, its poor economy at slow speeds, and lack of efficiency in driving the propeller against head seas.

The combination of the reciprocating engine and turbine has proven to have the best economy but retains all the disadvantages inherent in the reciprocating engine. It is, therefore, the object of my present invention to provide an improved system of power propulsion which will have a greater economy than has hitherto been attainable, which will operate with economy at both high or low pressures and speeds, which will operate with great efficiency with steam at high degrees of superheat, which will be simple in construction, free from reciprocating elements and in which inertia and vibration forces will be reduced to a minimum.

In order to accomplish the objects just stated I have invented a system embodying the combination of a rotary expansion engine with a turbine, thus doing away with the reciprocating movement and complication of the reciprocating engine, and at the same time obtaining to the fullest advantage the economy of the static effort of the steam at high pressures and the kinetic effort of the steam at low pressures, together with practically perfect suitability for high superheat conditions.

To these ends the invention consists in the novel arrangement and combination of the parts to be fully described hereinafter and the novelty of which will be particularly pointed out and distinctly claimed.

I have fully and clearly illustrated my invention in the accompanying drawings to be taken as a part of this specification and wherein—

Figure 4:
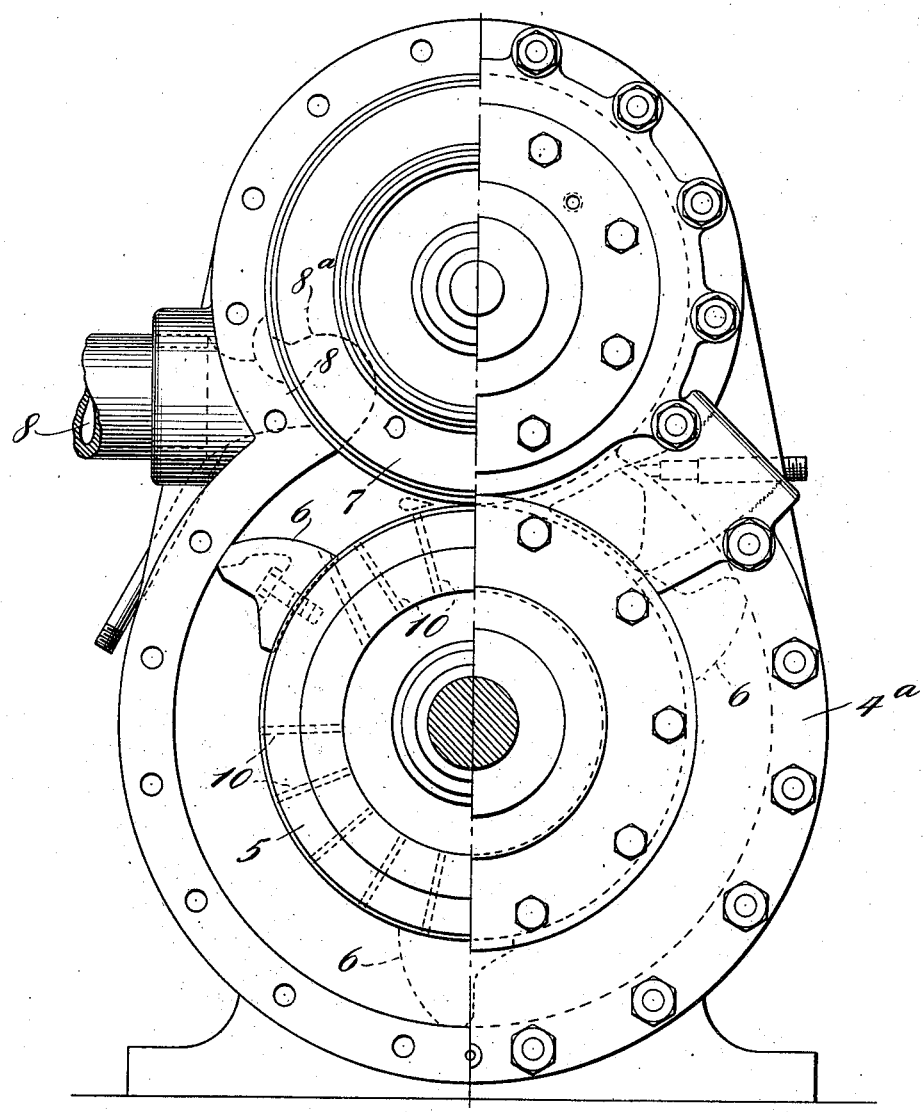
Figure 5:
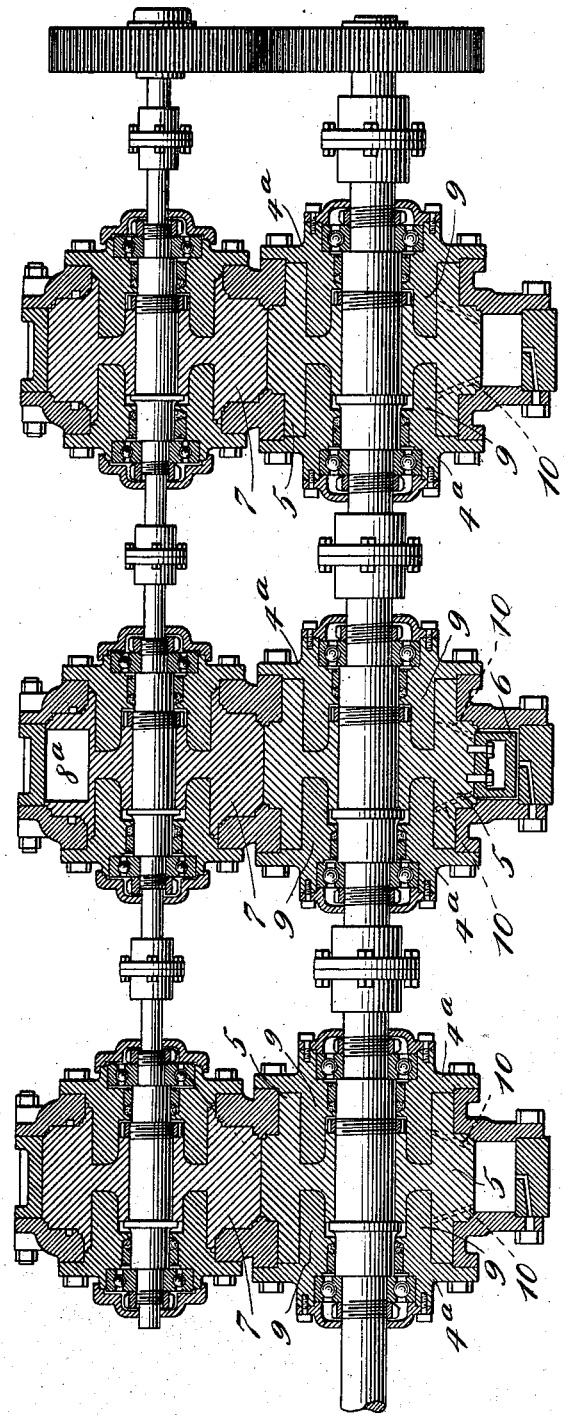

Figure 1 is a diagrammatic plan view of one embodiment of my invention in which I show a system for driving three propeller shafts, the central shaft being driven by a rotary unit including three rotary engines, and the wing propellers being driven by low pressure turbines which are driven by the exhaust steam from the rotary engines. Fig. 2 shows another embodiment of the invention showing four propeller shafts, the wing shafts being each driven by a unit of rotary engines, which exhaust into the turbines, the latter driving the inboard shafts. Fig. 3 is a view of another embodiment showing a three shaft drive, in which the central shaft is driven by a turbine and the outboard shafts being each driven by a rotary engine unit, both rotary engine units exhausting into the turbine to drive the latter. Fig. 4 is a view in side elevation with part of the casing removed of a rotary engine of the type which I have selected to use in my improved system. Fig. 5 is a longitudinal vertical central section through a unit of rotary engines forming part of my system. Fig. 6 is a plan view of another embodiment of the same invention in which a single shaft is driven by the rotary engines and turbine.

Referring to the drawings by characters of reference, and particularly Fig. 1, 1 designates a propeller shaft of a propeller system, in this instance, being the central or inboard shaft of a triple screw drive, said shaft being driven by a unit consisting of a series of rotary expansion engines, three in number, as at 2, 2, 2, all arranged to receive their initial impulses at different points in the circle of revolution so the shaft will be given an even torque at all points during its revolution, as indicated in Fig. 4. Each engine is designed to receive steam from a suitable source so that each exerts its individual power on the shaft. It will be understood that I do not desire to be limited to any arrangement which includes a plurality of engines, and that I only illustrate and describe such an embodiment as being an efficient example of my invention, which would also include a single rotary expansion engine. As shown in the drawings, these engines are preferably arranged with the axes of rotation of their rotors extending longitudinally of the ship.

The engines of the unit just described are arranged to have their exhausts liberated into the inlet of a multistage steam turbine, any arrangement being suitable for this purpose, the exhausts being connected by separate outlets 3, 3, 3, to a trunk 4, the latter connecting directly to the turbine inlet.

If desired, suitable means is provided for controlling the exhaust from the rotary engines to the turbine or turbines in order that the rotary engines may be driven independently of the turbines, or in order that any one or more of the rotary engines less than the whole number can be cut off from the turbines. A simple means for accomplishing this result consists in placing a suitable valve 3ª in each of the pipes 3, 3, 3, as shown in the drawing.

The turbine is preferably, although not necessarily, of the kind known as the low-pressure or multistage Parsons type designed to operate at the greatest efficiency and economy at low pressures, the same being provided with a condenser exhaust to provide for the efficient passage of the low pressure steam through the turbine. In the present embodiment two turbines are shown each adapted to drive one of the outboard shafts and it will be understood that both are arranged to receive exhaust steam from the rotary expansion engine, although I do not desire to be limited to any particular number of turbines.

The type of rotary expansion engine which I have adapted to form part of my improved system is that known as the Herrick engine, in which there is a rotor carrying a piston between which and a fixed abutment surface a motive agent is used expansively to exert its force against the piston to rotate the rotor. In this type of engine the steam is admitted between the abutment surface and the piston and is cut off by suitable valve mechanism. The engine and its general arrangement forms no part of my present invention except in so far as it is combined with the turbine, and I therefore do not deem it necessary to enter into a detailed description of the same other than to state, referring to Figs. 4 and 5, that 4ª designates a casing through which extends a shaft upon which is mounted to turn therewith a rotor 5 carrying a piston 6, against which the steam is admitted to exert its force expansively; 7 designates a rotary abutment arranged above the rotor 5 and in rolling contact with the surface thereof, said abutment being recessed to permit passage of the pistons 6. The inlet is shown at 8, and is in such position as to be uncovered by the recess in the abutment just after the piston passes the recess, and then be cut off by the further rotation of the abutment. The rotor turns on parts 9, 9 of the casing and passages 10 are provided for conducting steam from the steam side of the piston to the space between the rotor and said parts, whereby the load on the rotor is balanced. This balancing principle is covered by the U. S. Letters Patent to G. P. Herrick, dated July 13, 1909 and numbered 928,126. This engine is what may be termed a high pressure engine, and is designed to take steam from the boilers carrying a pressure of, say, 300 pounds per square inch, and heated to 200° superheat, so that it will be seen that these engines are capable of working under the most favorable conditions as to pressure and superheat.

As an example of a situation in which my present invention may be used, we can take, for purposes of illustration, a modern battleship, which has a speed of about 20 knots, and a corresponding horse power of about 30,000 and I provide this vessel with three screws as shown in Fig. 1, each of these screws to be driven by a 10,000 horse power unit, the screw shafts being driven by a series of high pressure Herrick rotary engines on the center shaft, each arranged to take steam at different periods of revolution, and a low pressure turbine on each of the outer shafts. The high pressure rotary engines will take steam from the boilers which carry a pressure of 300 pounds per square inch and which furnish the steam heated to 100 to 200 degrees superheat, or about 500 degrees F. total temperature. This steam being admitted to the rotary engines and expanded down to about 75 pounds or less, and exhausted from the rotary engines into the two outer turbines on the wing shafts, it will be evident that when the vessel is going at full speed each of the units will be delivering 10,000 horse power while the water rate for the combined outfit of rotary engines and turbines should not exceed over 12¼ pounds per horse power. It will be seen by this arrangement the rotary engine, or engines, take steam at high pressure and at a high degree of superheat and will utilize the same economically to drive the center propeller shaft, it being estimated that four expansions can be obtained in the simple rotary engine which, on account of its simplicity, will give from 85 to 90 per cent. efficiency in the system, which is an economy hitherto unattained. The steam exhausting from the rotary engine or engines into the low pressure turbines will drive the wing propeller shafts to the full capacity of the turbine power so that it will be seen that the driving effect is produced with the most economical consumption of steam, the combination of the rotary expansion engines and the turbines making it possible to utilize substantially the full power effort of the steam which enters the rotary expansion engine irrespective of leakage in the expansion engines past the pistons, in view of the fact that all such leakage passes into the exhaust and eventually exerts its effort upon the turbines. The metallic clearances between the moving parts in the rotary engine which occasion this leakage insure reliability while using the high temperatures occasioned by high pressure and superheated steam. In this arrangement the rotary engine arranged between a high pressure boiler and a low pressure turbine acts to reduce the steam pressure to a point where it can be effectively used in the turbines and at the same time acts as a prime mover itself operated by the steam passing through it while performing the reducing operation. In other words the rotary expansion engine uses the energy of the steam while it is being reduced. It will also be apparent that by use of a rotary expansion engine of the Herrick type in combination with a turbine or turbines another important advantage is attained which has long been desired in the marine propulsion art namely, to produce a power plant which will not only act economically in consumption of steam, but in which all the prime movers will be rotary in their movements, so that all vibration and the inertia forces are substantially obviated.

In Fig. 2 is shown a power system embodying the same principle as that shown in Fig. 1 except that a slightly different arrangement of the parts is necessary in order to adapt the same to a quadruple screw drive. In this arrangement I employ four propeller shafts arranged parallel to each other as shown at 10 the outer ones of which are driven by a series of Herrick rotary engines connected to said shaft in any suitable manner, the inner or inboard shafts being each driven by a low pressure turbine 12, which is connected to the exhaust of the rotary engines in any suitable manner as, for instance, by the pipes 13 discharging into an inlet pipe 14 connected to the inlet of the turbine. These turbines may be of the Parsons type, the condensers being shown at 15. In this arrangement there are substantially two distinct units each of which includes a series of rotary expansion engines of the Herrick type and a low pressure condenser turbine. In Fig. 3 I have shown another arrangement embodying the same principle shown in Figs. 1 and 2 in which three propeller shafts 16 are employed. In this arrangement the inner shaft is driven by a low pressure condenser turbine 17, in this instance being provided with two condensers 18, 18. The outer shafts are each driven by a series of Herrick type rotary expansion engines arranged on opposite sides of the turbine and having their exhaust connected to the inlet of the turbine by suitable pipe connections, as shown at 19.

In Fig. 6 I have shown a simple embodiment of the invention in which the rotary expansion engines and the turbine are arranged upon the same shaft, both being capable of driving the same. In this view 20 indicates the shaft, 21, 21, 21, the series of rotary engines, 22 the turbine and 23 the condenser connected with the latter. The general operation of the rotary engines and the turbine is the same as that heretofore described, and either both or one of said units may be used to drive said shaft. For instance, should it be desired to drive the shaft by the rotary expansion engines alone, the exhaust therefrom to the turbine may be cut off and the rotor of the turbine be permitted to run in a vacuum. The connections between the rotary expansion engines and the turbine are shown as consisting of the exhaust conduits 24 emptying into a trunk 25 connected to the inlet of the turbine. As applied to marine propulsion the system described has another important advantage, which is due to the fact that the ability of the rotary engine to be designed for a low speed of revolution enables a propeller wheel of the highest possible efficiency to be designed, and at the same time, a larger diameter of propeller can be used with the greatest possible advantages, for it is well known that in driving vessels into a head sea, the larger diameter of propeller wheel has every advantage over the small wheel, necessitated by the speed of the turbine, on account of the reduced slip obtained. Another advantageous feature present in connection with this system is, that owing to the fact that the exhaust steam is delivered into the turbine after it passes the rotary expansion engine, I am not compelled to design a rotary engine with that care necessary to prevent leakage past the piston and other points, as I am quite satisfied to accept the leakage which may prove necessary for its successful construction and allow the leakage that does occur to pass to the exhaust side of the rotary engine, and be finally utilized within the turbine itself.

While I have shown and briefly described a particular type of rotary expansion engine as forming part of my new system, I do not desire to be limited to any particular type of rotary expansion engine, but have selected the Herrick type for the reason that it has proved successful in accomplishing the desired results as to economy and adaptability to my purpose in actual tests under working conditions. When I use the term "rotary expansion engine" I mean that type of engine in which the fluid is admitted and cut off, the charge admitted exerting its force expansively between an abutment and a rotating portion, whereby the latter is rotated. Nor do I wish to be limited to the use of steam as a motive fluid, as the invention contemplates the use of a fluid exploded or burned as well as simply expanded without chemical change.

Having thus described my invention, what I claim as new and desire to secure by Letters Patent is:—

1. In combination, a rotary expansion engine comprising a casing, a rotary piston therein cleared from the casing, a multistage turbine separate and distinct from the rotary expansion engine, said engine and turbine being mounted on separate shafts disconnected from each other, and means whereby the steam driving the piston of the rotary expansion engine and passing the cleared portions thereof is exhausted into the turbine.

2. In combination, a multiple cylinder rotary engine, each cylinder containing a rotary piston cleared from the casing and said pistons being set at different points relative to each other in the cycle of revolution, a multistage turbine, said engine and turbine being mounted on separate shafts disconnected from each other, and means whereby the exhausts from the engine cylinders are exhausted successively into the turbine.

In testimony whereof I have signed my name to this specification in the presence of two subscribing witnesses.

LUTHER D. LOVEKIN.

Witnesses:
J. F. ANDREWS,
N. H. HAGGERTY.

---

Copies of this patent may be obtained for five cents each, by addressing the "Commissioner of Patents, Washington, D. C."